May 10, 1960 L. S. BILLMAN 2,935,848
FUEL INJECTION SYSTEM FOR RAMJET AIRCRAFT
Filed Feb. 9, 1955 3 Sheets-Sheet 1
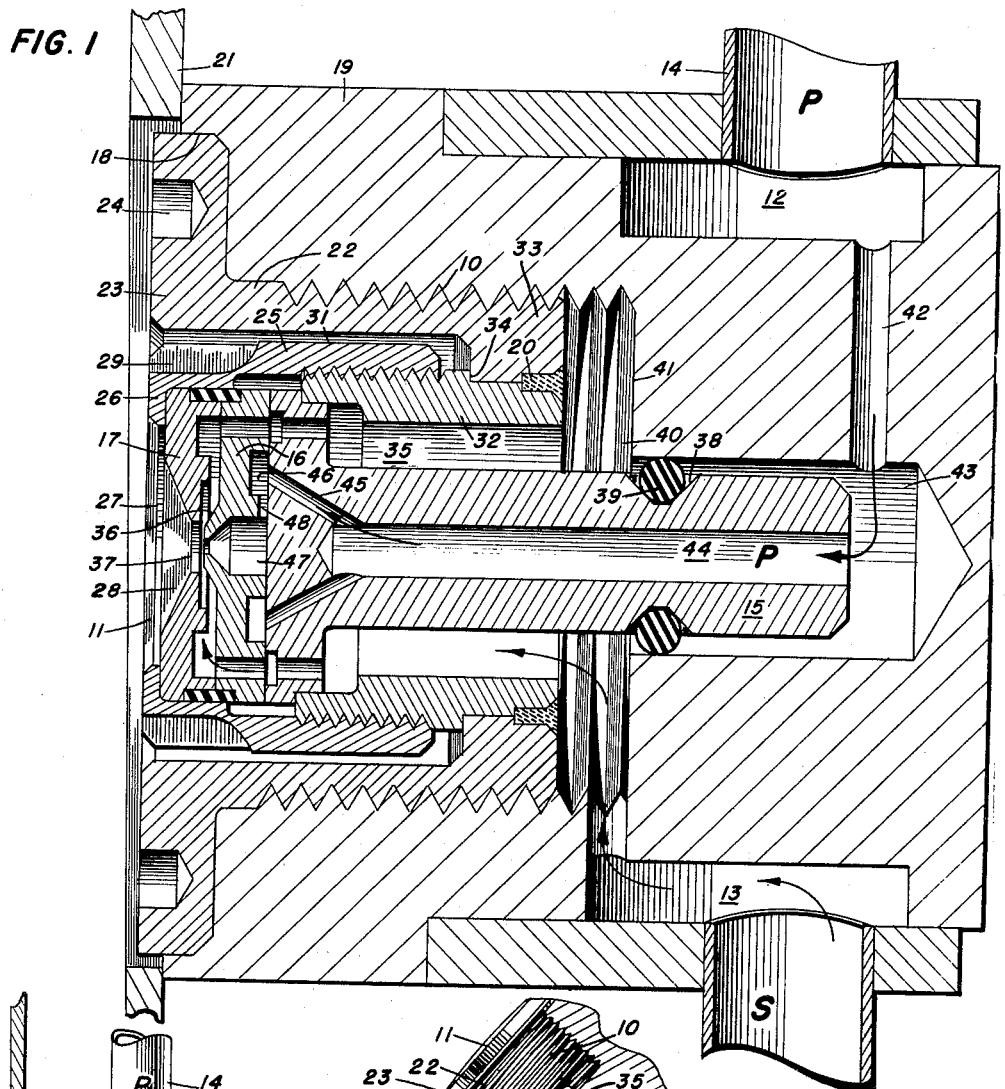
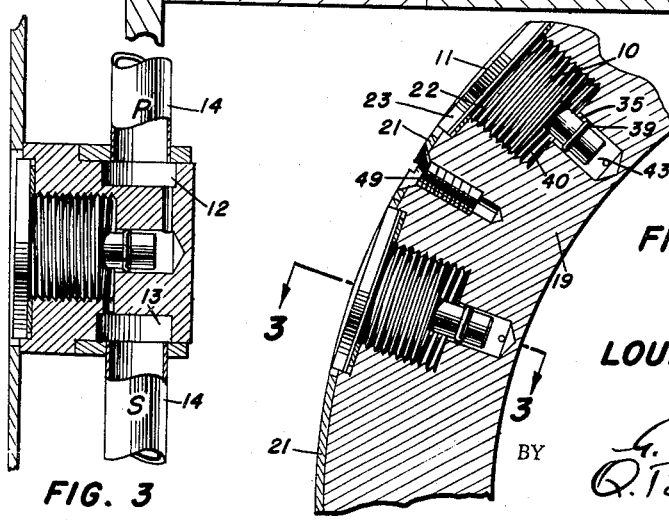
INVENTOR
LOUIS S. BILLMAN
BY
ATTORNEYS

INVENTOR
LOUIS S. BILLMAN
BY
ATTORNEYS

May 10, 1960 L. S. BILLMAN 2,935,848
FUEL INJECTION SYSTEM FOR RAMJET AIRCRAFT
Filed Feb. 9, 1955 3 Sheets-Sheet 3

INVENTOR
LOUIS S. BILLMAN
BY
ATTORNEYS

United States Patent Office 2,935,848
Patented May 10, 1960

2,935,848

FUEL INJECTION SYSTEM FOR RAMJET AIRCRAFT

Louis S. Billman, Lancaster, Calif., assignor, by mesne assignments, to the United States of America as represented by the Secretary of the Navy Application February 9, 1955, Serial No. 487,227

5 Claims. (Cl. 60—39.74)

The present invention relates to a fuel injection system for ramjet engines and more particularly to a fuel injection system for ramjet engines having two-stage fuel injector nozzles radially mounted within the diffuser inner body.

It has been found that two-stage fuel injector nozzles are usually required in a ramjet, especially in ramjets which are to encounter a wide range of flight speeds and altitudes. Two-stage fuel injector nozzles have in actual practice attributed a good atomization of the fuel over a broad fuel flow range. This important characteristic of the two-stage nozzle has enabled ramjet fuel combustion to take place in a manner such that uniform burning of a large percentage of the total atomized fuel present in the combustion chamber is possible. The atomized fuel-air mixture is maintained substantially homogeneous by the arrangement of the nozzles about the diffuser inner body walls.

Known methods of mounting fuel injector nozzles flush with the combustion chamber wall of supersonic aircraft involve stationing the fuel manifolds for injectant orifices circumferentially without the combustion chamber wall in relationship to the fixed position of the fuel igniter or holder located within the chamber. It is difficult to achieve a homogeneous fuel-air mixture when the fuel is injected into the combustion chamber from such nozzles, because the mass-air flow generally establishes a boundary layer of air with the inner surface of the combustion chamber wall. The presence of the inner surface boundary layer of air restricts the flow of high velocity mass-air toward the center of the chamber due to the turbulent frontal area produced by the boundary layer of air in frictional contact with the chamber walls. Therefore, when the injectant is introduced into the air stream of the combustion chamber, the fuel-air ratio is heterogeneous in any cross-sectional area of the chamber. The consistency of fuel-air mixture changes from a rich mixture in the boundary layer zone to a lean mixture in the high velocity mass-air flow zone irrespective of the fuel injection pressure, and a nonuniform fuel mixture inhibits smooth thrust characteristics of the ramjet.

The present invention overcomes the above-mentioned prior art deficiencies of fuel injection systems for ramjets by the provision of a multipoint radial fuel injection system which includes two-stage fuel injector nozzles to vary the fuel-air mixture in accordance with flight speed and altitude demands. The radial injection system is mounted in a manner which contributes to a substantially homogeneous fuel-air mixture available in a major portion of the combustion chamber.

An object of the present invention is the provision of a fuel injection system for ramjets which contributes combustion characteristics favorable for uniform thrust of ramjets.

Another object is to provide a fuel injection system for ramjets which includes two-stage fuel injector nozzles annularly mounted within the diffuser inner body to achieve a substantially homogeneous fuel mixture throughout the combustion area of the chamber.

Another object is the provision of valve operating apparatus for flush skin mounted fuel injector nozzles which permits two-stage nozzles to be operated within the restricted area of a ramjet diffuser inner body.

Still another object of the present invention is to provide a valve actuating system which permits metering of fuel to the injector nozzles of the ramjet power unit.

A further object is the provision of a fuel injection system for ramjets wherein the fuel nozzles are mounted inside the inner body of the diffuser flush with the skin thereof to improve atomized fuel mixing and to permit ram air to pass through the diffuser air passage without interruption by fuel lines and nozzle support structure.

Another object is to provide a two-stage fuel injector nozzle having readily adjustable components which attribute to ease of serviceability of critical areas of the nozzle.

Other objects and many of the attendant advantages of this invention will be readily appreciated as the same becomes better understood by reference to the following detailed description when considered in connection with the accompanying drawings wherein:

Fig. 1 shows a sectional view of a preferred embodiment of the invention;

Fig. 2 illustrates a transverse section of a portion of the device of Fig. 1 mounted flush with the skin of a ramjet diffuser inner body;

Fig. 3 shows a section of the device taken substantially along the line 3—3 of Fig. 2 looking in the direction of the arrows;

Figure 5:
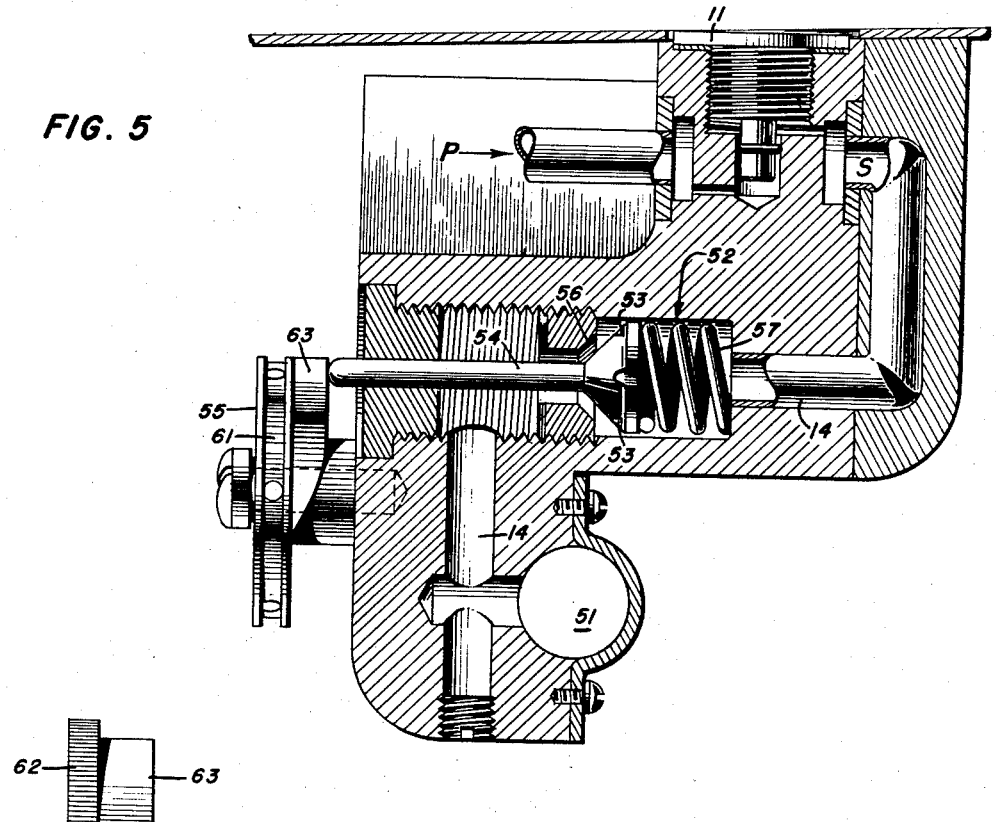
Fig. 5 is a sectional view taken substantially along the line 5—5 of Fig. 4 looking in the direction of the arrows.

Referring now to the drawings in detail wherein like reference characters designate like or corresponding parts throughout the several views, there is shown in Fig. 1, which illustrates a preferred embodiment, a two-stage fuel nozzle 11 having a primary fuel inlet port 12 and a secondary fuel inlet port 13 each communicating with a fuel manifold, not shown, by suitable piping 14. The nozzle body is substantially comprised of a nozzle stem 15, a stem cap 16, and an orifice front piece 17, each being in superjacent relation on a mutual axis. The nozzle 11 is adjustably mounted by suitable means such as screw threads 10 into tapped openings 18 of ramjet support structure such as the diffuser inner body 19 flush with the diffuser surface 21 by means of an externally threaded casing member 22 having an annular collar flange 23 at one extremity thereof and provided with tool openings 24 in the flange for ease of manipulation or adjustment of the casing member 22. The collar flange 23 is faired to form a continuance of the surface to which it is flush mounted.

An intermediate internally threaded clamping sleeve 25 is coaxially spaced apart from the externally threaded casing member 22 and is provided at one end with an inwardly directed annular flange 26 having a tapered surface 27 which constitutes the outermost portion of the progressively enlarging frustro-conical nozzle orifice generally denoted as element 28. The annular flange 26 serves to frictionally clamp the orifice front piece 17 and the stem cap 16 into their relative positions within the nozzle component arrangement. Tool mating indentation surfaces 29 are circumferentially located on the outermost cylindrical wall section 31 of clamping sleeve 25 which permits the removal of the nozzle orifice components such as elements 16 and 17 without the necessity of dismantling the entire nozzle from its support structure to service the orifice components.

An inner sleeve 32 is threadedly engaged to clamping sleeve 25 and coaxial therewith. Sleeve 32 is attached to the lowermost section 33 of casing 22 by suitable means such as annular weld 20 thus firmly seating the recessed surface 34 of inner sleeve 32 to orient the casing 22 and sleeve 25 into their proper alignment with regard to the orifice front piece 17, stem cap 16, and nozzle stem 15.

The secondary fuel feed from the secondary inlet fuel port 13 to the orifice 28 of nozzle 11 is accomplished by providing an annulus 35 surrounding the stem 15 which is aligned with a plurality of holes provided in companion flanges of the stem 15 and stem cap 16 and laterally to a central deflecting surface 36 of cap 16 in registry with a central aperture 37 provided in the orifice front piece 17.

A circumferential recess 38 on the lower portion of nozzle stem 15 receives a seal 39 which frictionally engages the walls of the ramjet support structure 19 to effectively divide the path of the primary fuel flow from the path of the secondary fuel flow. Vertical spacing of casing 22 and sleeve 32 above the ramjet support structure shoulder 41 forms an area 40 which restricts the secondary fuel flow from the inlet port 13 to the annulus 35.

An inwardly directed channel 42 formed in the ramjet support structure 19 introduces the primary fuel from inlet port 12 to the bore 43. Stem 15 of nozzle 11 is provided with a longitudinally extending hollow center 44 which serves as a primary fuel conduit, and which is furcated at its upper extremity to form a plurality of passages 45.

Passages 45 connect the hollow center 44 of stem 15 with a circumferentially spaced stem cap annulus 46 which communicates with a centrally positioned nozzle chamber 47 within stem cap 16 by means of lateral passageways 48. Chamber 47 decreases in diameter to direct the primary fuel under pressure through the central aperture 28 of the orifice front piece 17 of nozzle 11.

Nozzle 11, which is illustrated in detail in Fig. 1, is shown mounted within the inner body of a diffuser in Fig. 2. The inner body may be circular in shape as depicted in Fig. 2 wherein the outer surface of collar flange 23 of the casing 22 is flush with the inner body skin surface 21. A fixture member such as screw 49 may be utilized to reinforce the skin 21 about the nozzle location. The nozzles may be located at circumferentially spaced points on the inner body surface, their number depending upon the fuel requirements of the desired ramjet thrust. Fuel is fed under pressure perpendicular to the mass-air flow rammed into the diffuser section of the ramjet and by the placement of the nozzles and auxiliary components within the inner body of the diffuser the diffuser air passage section is not interrupted by fuel nozzle support struts and plumbing which tend to reduce diffuser efficiency.

Figure 7:
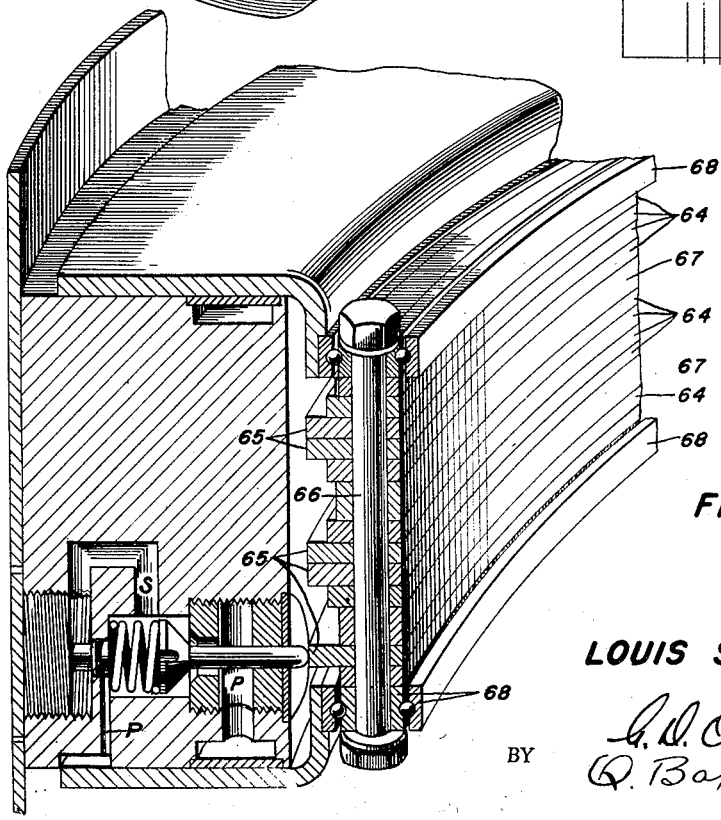
Fig. 7 is a cross section of a modification of the device.

To promote the introduction of a uniform fuel mixture into the combustion chamber for a smooth and orderly burning the secondary fuel lines may be valve-controlled by means of apparatus such as that shown in Figs. 5 and 7 whereby the volume of the secondary fuel is metered into the air stream in order to maintain optimum fuel-to-air mixture at various altitudes and speeds of the aircraft. A manifold 51 carries the secondary fuel to the individual nozzles 11 through connecting lines 14 which are separated by meter valve 52. The fuel is ported around the valve shoulders 53 when valve stem 54 is given motion to the right by the action of cam wheel 55 to lift valve 52 from its seat 56 in the normal meter valve manner. A coil spring 57 biases the valve to a closed position when cam pressure from wheel 55 is relieved.

Figure 6:
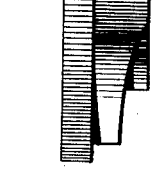
Fig. 6 shows a modification of the cam of Fig. 5.
Figure 4:
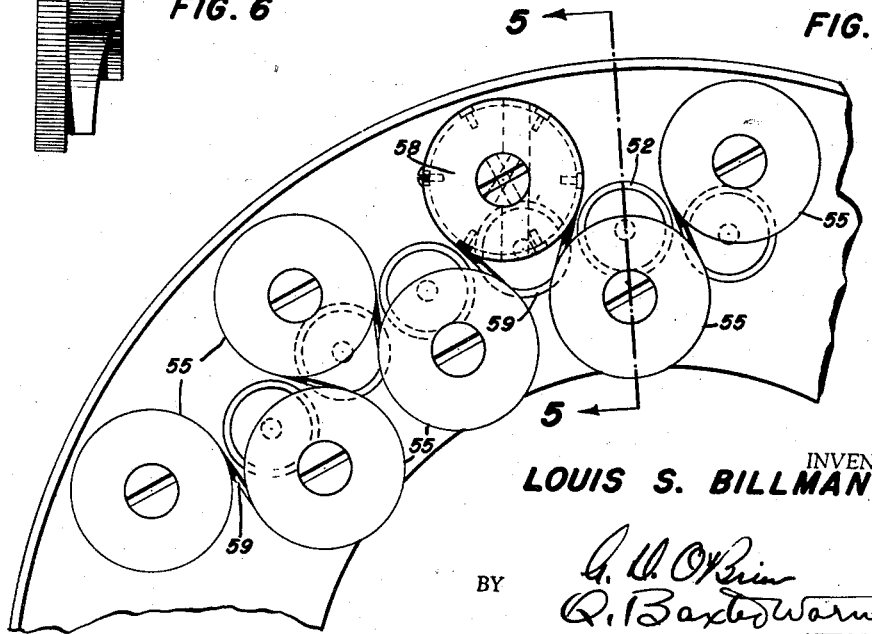
Fig. 4 is a front elevation of the apparatus.
Figure 8:
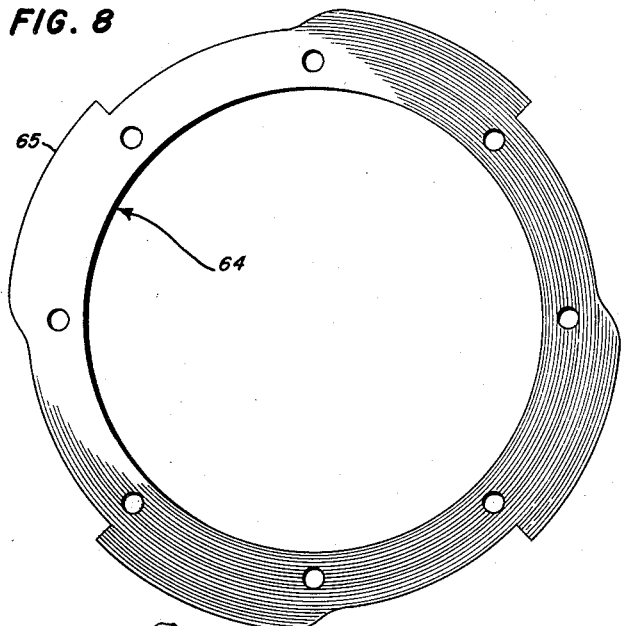
Fig. 8 shows an elevation of a valve actuating cam disc found in Fig. 7.

Referring to Fig. 4, it can be seen that systematic operation of the cam wheels 55 which control the opening of the secondary fuel lines to introduce the secondary fuel from nozzles 11 into the air stream of the diffuser section of the ramjet is carried out by the provision of a master wheel 58, powered from a source not disclosed, which is coupled to the cam wheels 55 of the individual nozzles 11 by suitable means such as a cable 59 which may ride in a rim 61 provided in the wheel 55 as shown in Fig. 5, or such as by gear teeth 62 provided on wheels 55 as shown in Fig. 6. The volume of fuel feed may be changed by simply a partial rotation of the master wheel 58 to open the meter valve 52.

Figure 9:
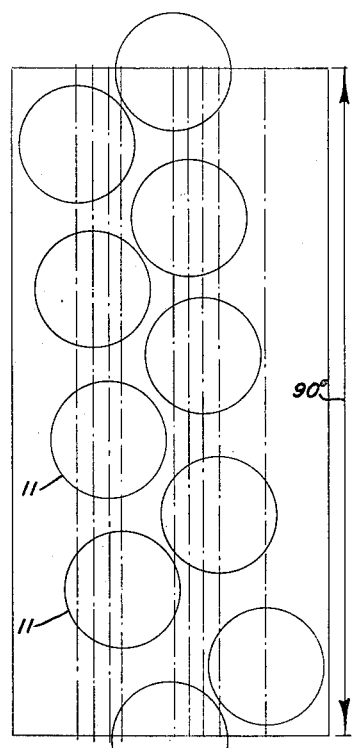
Fig. 9 illustrates a top view of a 90° annular portion of an annular diffuser surface having fuel injection nozzles positioned therein.

Another system of the valve operation is shown in Fig. 7 wherein a plurality of cam discs 64 are superposed to form a cylinder having cam protuberances 65 positioned about its outer surface in parallel spaced relationship as well as circumferential spaced relationship. The angular disposition of the cam protuberances 65 of cam discs 64 is accomplished such that fuel metering is achieved, and their disposition may be fixed by a suitable fastening means such as bolt 66 which passes through each of the cam discs 64. By means of spacer segments 67 the cam discs are stationed in adjacent alignment with their respective valve stems 54 to activate nozzles 11 spaced about the diffuser inner body surface as shown in Fig. 9.

This invention provides a fuel injecting system which may be located wholly within a diffuser inner body structure, and allows a two-stage fuel nozzle to inject a predetermined volume of fuel into the mass-air flow passing through the diffuser section of a ramjet power unit. Fuel flows through the primary fuel lines of the two-stage nozzles until maximum flow is obtained, at which time additional fuel as required is fed through the secondary fuel line of the nozzle upon activation of the meter valve 52.

Obviously many modifications and variations of the present invention are possible in the light of the above teachings. It is therefore to be understood that within the scope of the appended claims the invention may be practiced otherwise than as specifically described.

What is claimed is:

1. A valve operating means for multiple fuel nozzles of an injection system each nozzle having a fuel metering valve in cooperation therewith comprising; a rotatable cam wheel for each fuel metering valve formed with a gear-toothed rim of a diameter so as to mesh with an adjoining gear-toothed rim of another cam wheel, a power driven master wheel having a gear-toothed rim for rotating said cam wheels, a cam formed on said cam wheel and rotatable therewith for operating the metering valve uniformly and at predetermined intervals during rotation of said cam wheel, each of said nozzles having a primary and secondary fuel line in communication therewith, the secondary fuel line allowing the passage of a secondary fuel therefrom and into each of said nozzles as said valve is operated while said primary fuel line allows a continuous flow of primary fuel therefrom and into said nozzles, and means on one end of each nozzle for allowing the mixing of said primary and secondary fuels as the fuels reach said one end of the nozzle.

2. A valve operating means for multiple fuel nozzles of an injection system each nozzle having a fuel metering valve in cooperation therewith comprising; a cam wheel formed with a peripheral cable receiving recess for cooperation with each fuel metering valve, a flexible cable rotatably coupling each of said cam wheels, a power driven master wheel having a cable receiving peripheral recess and coupled to said cam wheels by said cable whereby rotation of the master wheel imparts an equal and simultaneous rotation to said cam wheels, and a cam formed on said wheel and rotatable therewith for operating the metering valves uniformly and at predetermined intervals during the rotation of said cam wheel, means including said metering valve for allowing the passage of a secondary fuel through said nozzles as the metering valve is operated, means including a passage in said nozzles for allowing a continuous flow of a primary fuel through said nozzles, and means disposed at one end of the nozzles for allowing the mixing of said primary and secondary fuels when the fuels pass through and reach said one end of the nozzles.

3. A valve operating means for multiple fuel nozzles of a fuel injection system each nozzle having a fuel metering valve in cooperation therewith comprising; a plurality of annular rotatably mounted discs each for operation of said metering valve and mounted to form a cylinder, a plurality of laterally extending cams formed on each of said annular discs in parallel spaced relationship and rotatable therewith upon rotation of said cylinder for equally and simultaneously operates the valve of the respective nozzles at predetermined intervals, means including said metering valve for allowing the passage of a secondary fuel through said nozzles as the metering valve is operated, means including a passageway in said nozzles for allowing a continuous flow of primary fuel through the nozzles, means including an element in sealing engagement with said nozzles for preventing mixing of said fuels until the fuels reach one end of the nozzles, and means carried by and disposed in said one end of the nozzles for allowing the mixing of said fuel prior to injection of the fuels from said nozzles.

4. A fuel injection system for ramjets having a diffuser inner body comprising a plurality of fuel injector nozzles mounted within the inner body and radially spaced thereabout, a manifold located within the body, each of said nozzles having a primary and secondary fuel feed line connecting said nozzles with said manifold, said primary fuel feed line supplying primary fuel to said nozzles continuously, a metering valve positioned on each of said secondary fuel feed lines in communication with said nozzles and manifold for varying the amount of a secondary fuel passing through the nozzles, a rotatably mounted valve control means adjacent and cooperating with each of said valves, a master control device for rotating said valve control means, each of said valve control means coupled to another one of said valve control means and to said master control device for operating said valves equally and simultaneously during rotation of said control means, means including a sealing ring in engagement with said nozzles and the body for preventing mixing of said primary and secondary fuels as said fuels travel a predetermined distance through said nozzles, and means on one end of said nozzles for allowing the mixing of said fuel when the fuels have traveled said predetermined distance and prior to injection of the fuels from the nozzles.

5. A fuel injection system for ramjets having a diffuser inner body and comprising a plurality of fuel injector nozzles mounted within the inner body and radially spaced thereabout for injecting fuel into the airstream, a manifold located within the body, each of said nozzles having a primary and secondary fuel feed line within the body connecting said nozzles with said manifold for feeding primary and secondary fuels to said nozzles, a metering valve positioned in each of said secondary fuel feed lines in communication with said nozzles to vary the amount of secondary fuel passing therethrough, rotatably mounted metering valve control means cooperating with and adjacent each of said valves, a master control device for said control means, a flexible element coupling each of said metering valve control means together and to said master control device for operating said valve equally and simultaneously during rotation of said control means, stem means on said nozzles and forming a centrally disposed passageway in communication with said primary fuel feed line for allowing the passage of primary fuel through the nozzles to one end thereof, additional means on said nozzles cooperating with the body and forming an annular passageway surrounding said stem means for allowing the passage of said secondary fuel through said nozzles to said one end of said nozzles as said valves are operated, sealing means in engagement with said stem means and the body for sealing off said centrally disposed passageway from the annular passageway, a plurality of passages in said nozzles at said one end thereof in communication with said centrally disposed passageway in said stem means, additional passages in said nozzles at said one end thereof in communication with said annular passageway, and means on said nozzles forming a chamber at said one end thereof in communication with said plurality of passages and the additional passages for allowing the mixing of said primary and secondary fuels as the fuels enter said chamber and during injection thereof into the airstream.

References Cited in the file of this patent

UNITED STATES PATENTS

| | | |
|---|---|---|
| 979,532 | Merrill | Dec. 27, 1910 |
| 1,147,634 | Lotz | July 20, 1915 |
| 1,961,198 | Corley | June 5, 1934 |
| 2,299,211 | Clench | Oct. 20, 1942 |
| 2,388,208 | Foss | Oct. 10, 1945 |
| 2,410,538 | Walton | Nov. 15, 1946 |
| 2,419,866 | Wilson | Apr. 29, 1947 |
| 2,536,440 | Greenland | Jan. 2, 1951 |
| 2,571,583 | Kolbach | Oct. 16, 1951 |
| 2,625,788 | Neikirk | Jan. 20, 1953 |
| 2,630,324 | Lay | Mar. 3, 1953 |
| 2,639,193 | Wood | May 19, 1953 |
| 2,647,796 | Ziherl | Aug. 4, 1953 |
| 2,701,609 | Thorpe et al. | Feb. 8, 1955 |
| 2,753,686 | Billman | July 10, 1956 |
| 2,825,398 | Clarke | Mar. 4, 1958 |
| 2,861,420 | Lewis | Nov. 25, 1958 |

FOREIGN PATENTS

| | | |
|---|---|---|
| 645,696 | Great Britain | Nov. 8, 1950 |